(12) United States Patent
Brinkley et al.

(10) Patent No.: US 7,908,042 B2
(45) Date of Patent: Mar. 15, 2011

(54) METHODS AND APPARATUS FOR WIRELESS UPLOAD AND DOWNLOAD OF AIRCRAFT DATA

(75) Inventors: Roger R Brinkley, Woodinville, WA (US); Timothy M Mitchell, Seattle, WA (US); Jerry L Price, Sammamish, WA (US); David R Lee, Renton, WA (US)

(73) Assignee: The Boeing Company, Chicago, IL (US)

( * ) Notice: Subject to any disclaimer, the term of this patent is extended or adjusted under 35 U.S.C. 154(b) by 1213 days.

(21) Appl. No.: 11/187,085

(22) Filed: Jul. 22, 2005
(Under 37 CFR 1.47)

(65) Prior Publication Data
US 2007/0027589 A1    Feb. 1, 2007

(51) Int. Cl.
*G01C 23/00* (2006.01)
*G06F 17/00* (2006.01)

(52) U.S. Cl. .................. 701/3; 701/2; 701/120; 455/66; 455/98; 455/412.1; 455/414.1; 455/419; 455/426.2; 455/431; 455/899; 342/29; 342/33; 342/36

(58) Field of Classification Search .................. 701/2, 3, 701/120; 455/66, 98, 412.1, 414.1, 419, 455/426.2, 431, 899; 342/29, 33, 36
See application file for complete search history.

(56) References Cited

U.S. PATENT DOCUMENTS

| | | | |
|---|---|---|---|
| 3,573,740 A | 4/1971 | Berger et al. | |
| 4,646,993 A | 3/1987 | Baetke | 244/117 R |
| 5,044,578 A | 9/1991 | White et al. | 244/119 |
| 5,077,671 A | 12/1991 | Leslie et al. | |
| 5,079,707 A | 1/1992 | Bird et al. | |
| 5,175,198 A | 12/1992 | Minnick et al. | 533/222 |
| 5,307,505 A | 4/1994 | Houlberg et al. | |
| 5,424,949 A | 6/1995 | Applegate et al. | |
| 5,428,650 A | 6/1995 | Pitot | |
| 5,761,625 A | 6/1998 | Honcik et al. | |
| 5,805,828 A | 9/1998 | Lee et al. | |
| 5,841,969 A | 11/1998 | Fye | |
| 5,970,395 A | 10/1999 | Weiler et al. | |

(Continued)

FOREIGN PATENT DOCUMENTS

WO    WO 00/07126    2/2000

OTHER PUBLICATIONS

Master Sgt. Patrick E. Clark, "Pacer CRAG, Command's KC-135s receiving avionics, navigation upgrades," Citizen Airman, Feb. 1999, http://www.fas.org/nuke/guide/usa/bomber/990200-crag.htm; 2 pages.

(Continued)

*Primary Examiner* — Jack Keith
*Assistant Examiner* — Chuong P Nguyen
(74) *Attorney, Agent, or Firm* — Harness, Dickey & Pierce, P.L.C.

(57) ABSTRACT

A method for wirelessly communicating data between a plurality of avionics units on an aircraft and a data communication apparatus. The method includes wirelessly communicating download data for one avionics unit from the data communication apparatus to an aircraft data services link in the aircraft; automatically switching a communication path from the aircraft data services link to the avionics unit responsive to the download data; and electronically communicating the download data from the data communication apparatus to the avionics unit via the automatically switched communication path.

9 Claims, 3 Drawing Sheets

U.S. PATENT DOCUMENTS

| | | | |
|---|---|---|---|
| 6,047,165 | A | 4/2000 | Wright et al. |
| 6,104,914 | A | 8/2000 | Wright et al. |
| 6,108,523 | A | 8/2000 | Wright et al. |
| 6,148,179 | A | 11/2000 | Wright et al. |
| 6,154,636 | A | 11/2000 | Wright et al. |
| 6,154,637 | A | 11/2000 | Wright et al. |
| 6,160,998 | A | 12/2000 | Wright et al. |
| 6,163,681 | A | 12/2000 | Wright et al. |
| 6,167,238 | A | 12/2000 | Wright |
| 6,167,239 | A | 12/2000 | Wright et al. |
| 6,173,159 | B1 | 1/2001 | Wright et al. |
| 6,181,990 | B1 | 1/2001 | Grabowsky et al. |
| 6,278,396 | B1 | 8/2001 | Tran |
| 6,353,734 | B1 | 3/2002 | Wright et al. |
| 6,385,513 | B1 * | 5/2002 | Murray et al. ............. 701/14 |
| 6,438,468 | B1 * | 8/2002 | Muxlow et al. ............. 701/3 |
| 6,477,152 | B1 | 11/2002 | Hiett |
| 6,559,812 | B1 | 5/2003 | McCarten et al. |
| 6,671,589 | B2 | 12/2003 | Holst et al. |
| 6,760,778 | B1 * | 7/2004 | Nelson et al. ............. 709/246 |
| 2002/0111720 | A1 | 8/2002 | Holst et al. |
| 2003/0003872 | A1 | 1/2003 | Brinkley et al. |
| 2003/0069015 | A1 | 4/2003 | Brinkley et al. |
| 2003/0148736 | A1 * | 8/2003 | Wright et al. ............. 455/66 |
| 2005/0026609 | A1 * | 2/2005 | Brinkley et al. ............. 455/431 |
| 2005/0197748 | A1 * | 9/2005 | Holst et al. ............. 701/3 |
| 2007/0127521 | A1 * | 6/2007 | Sandell et al. ............. 370/466 |
| 2007/0139169 | A1 * | 6/2007 | Mitchell et al. ............. 340/425.5 |
| 2007/0198513 | A1 * | 8/2007 | Stelling et al. ............. 707/6 |
| 2009/0077265 | A1 * | 3/2009 | Brinkley et al. ............. 709/249 |

OTHER PUBLICATIONS

"KC-135R Stratotanker, Pacer CRAG (Compass, Radar and GPS)," http://www.globalsecurity.org/military/systems/aircraft/kc-135r-pacer-crag.htm; 4 pages.

"The Next Generation of Aircraft Data Link," Rockwell Collins, 2002, 13 pages.

"Databus Tutorial," Ballard Technology, Inc., http://www.ballardtech.com/tutorial.asp, 4 pages.

"Wireless GroundLink®," Teledyne Controls, http://www.teledyune-controls.com/productsolution/wirelessgroundlink/groundlink.asp, 1 page.

CNS Systems Inc. "Data Communications for the Air Transport Industry," Feb. 1998, pp. 1-3, http://www.cnssys.com/ATC-Data-Comm.html.

Anonymous, "ARINC Protocol Tutorial Manual"; Condor Engineering, Inc., Santa Barbara, Jun. 7, 2000, XP002542767, 27 Pages.

* cited by examiner

METHODS AND APPARATUS FOR WIRELESS UPLOAD AND DOWNLOAD OF AIRCRAFT DATA

CROSS-REFERENCE TO RELATED APPLICATIONS

This application claims the benefit of U.S. Provisional Application No. 60/268,085, filed Feb. 13, 2001, which is hereby incorporated by reference in its entirety. This application is a continuation of U.S. patent application Ser. No. 10/883,029, filed on Jun. 30, 2004, which is a continuation of U.S. patent application Ser. No. 10/075,083 filed on Feb. 12, 2002, both of which are incorporated herein by reference. This application is also related to U.S. patent application Ser. No. 10/075,032, filed on Feb. 12, 2002, which is also incorporated by reference in its entirety.

FIELD OF THE INVENTION

The present invention relates to communications systems, and more particularly to methods and apparatus to facilitate loading and acquisition of data relating to aircraft loadable computers.

BACKGROUND OF THE INVENTION

Digital computers on recent airplane models require frequent software updates. Flight management computers (FMCs) were among the first of these computers to have periodic updates performed. Originally, these updates were performed according to a tape loading standard (ARINC 603) that required the use of a portable device having one ARINC 429 output and two inputs. The loading was performed by attaching a cable and a portable tape loader to a 32-pin data loader connector located in the cockpit of the airplane. The location of this connector was chosen in different model airplanes to avoid having a mechanic crawl around an electrical equipment (EE) bay each time he was required to perform a software update. Nevertheless, it was soon recognized that portable tape loaders were slow, large and cumbersome. Thus, a new data loading standard, ARINC 615-1, was developed to utilize standard 3½" floppy disks.

To accommodate new ARINC 615-1 loaders, the 32-pin data loader connector was replaced with a new 53-pin connector. In addition, some airlines preferred that loaders be configured for permanent mounting on primary long haul aircraft. As a result, the ARINC 615 specification was upgraded to accommodate additional busses in an attempt to anticipate a maximum number of loadable units that would require an interface with an ARINC 615 loader. Today, as many as 24 loadable Line Replaceable Units (LRUs) may be found on a single aircraft. However, only eight LRUs can be accommodated by the ARINC 615-3 specification.

One solution to the increasing number of LRUs on an aircraft has been to provide a Portable Data Loader (PDL) connector with a multiple position rotary switch. In some cases, approximately 200 wires populate four circular connectors located on the data loader switch installed on a maintenance panel.

Data communication between aircraft and ground began using existing HF and VHF radios to transmit character data stored in a few avionics line replaceable units (LRUs). The routing of information such as central maintenance computer and aircraft condition monitoring system reports in one known data communication system is under control of a management unit (MU) based on ARINC 724 specifications. The interfaces through which data has been routed from aircraft systems are traditional analog discrete and ARINC 429 data bus interfaces.

As the complexity of aircraft communication and reporting systems (ACARS) have increased, production aircraft have been provisioned with more advanced versions of such systems based on ARINC 758 specifications. One such communication management unit (CMU) is capable of handling protocol layers beyond those specified by ARINC 724B. One known CMU is also intended to accommodate interfaces to Ethernet-based systems, adding an additional, non-traditional physical layer. Digital link radios currently in development would further improve transmission between ground stations and aircraft. However, bandwidth for this technology still lags that provided by broadband satellite data communications.

ARINC 758 CMU functionality manages the routing of data for aircraft avionics systems over data link radios and satellite communication systems (SATCOM), with expandability to Ethernet-compatible systems. Sources and end users for communication with a ground station include satellite data units (SDUs), ACMS, central maintenance computers (CMCs), and optional cabin terminals via HF, VHF, SATCOM, and new data link radios. Aircraft information to the CMU comes from many avionics sources, such as display systems, flight management computers (FMCs), DFDAU digital discretes, ACMS, DFDAU ARINC 753 data, out/off/on/in (OOOI) discretes and transponders. Two-way communication is also established between multifunction control and display units (MCDUs), printers, data loaders, and aircraft programmable modules (APMs). CMUs are also capable of driving up to two sets of alert output discretes.

The aircraft industry is currently developing ARINC 763 Network Server Systems (NSS), which will have management capability for routing information over IEEE 802.11 transceivers utilizing wireless spread spectrum technology as well as Ethernet interface capability. The primary avionics data sources that ARINC 763 systems require are aircraft parametric information and 2-way ARINC 429 communication directly between avionics LRUs and a server interface unit (SIU).

As currently envisioned, ARINC 763 NSS will acquire parametric data and status via an ARINC 573/717 serial output of a digital flight data acquisition unit (DFDAU). To update software in avionics LRUs, the SIU is wired upstream from a rotary switch, between the switch and an existing portable data loader connector or an installed airborne data loader. However, one problem with designs of this type is that only raw parametric data out of the DFDAU is available. Processed reports, based on re-configurable capture criteria in ACMS, e.g., operator selectable channels of smart access recorder (SAR) data, re-programmable ACMS triggered reports, in addition to raw data intended for quick access recorders (QAR), are only available via an ARINC 615-3 data loader interface to the ACMS, and can be retrieved on-ground via disk download, or via ACARS as a defined trigger-event occurs.

A primary goal of aircraft manufacturers is to minimize changes to aircraft production processes while at the same time offering increased functional capability and ease of use in new product offerings. When numerous new wiring, LRUs and supporting components are added to production aircraft, aircraft manufacturers incur large, non-recurring costs. To avoid drastic changes that would incur these large costs, ARINC 763 NSSs are being designed with a limited subset of traditional aircraft interfaces. For example, one known ARINC 763 NSS is being designed to tie into two primary interfaces. The first of these two interfaces is an ARINC 573/717 DFDAU serial output bus to an existing QAR interface or parallel ARINC 573/717 path. The second is an existing data loader interface. NSS designers thus minimize usage of aircraft information from different aircraft sources and add a new communication medium to the aircraft information routing scheme, namely, wireless IEEE 802.11. Thus, some data movement issues on the aircraft side remain and some existing features, available in other known avionics LRUs, are not fully utilized.

Also, ARINC 758 and ARINC 763 systems have different philosophies regarding routing of aircraft information. ARINC 753 systems are connected to many existing aircraft interfaces with air/ground and limited ground/ground communication via existing radio and satellite technology. On the other hand, ARINC 763 systems are being designed for connection to a very small number of aircraft interfaces with ground to ground and limited air to ground communication (depending upon the distance to an access point) using wireless spread spectrum IEEE 802.11 communication technology. Known systems do not provide integration of these routing functions.

Present maintenance practices for downloading aircraft data into Avionics line replaceable units (LRUs) include using a portable or PC-based ARINC 615-3 data loader to download part number controlled databases, operational program configuration (OPC) files, and operational program software (OPS) that is ordinarily transferred using 3¼" floppy disks. A permanently mounted airborne data loader (or a bulk loader in a shop environment) can also be used to load aircraft LRUs.

Software loadable LRUs in at least one aircraft line can be downloaded with controlled information stored on floppy disks. The loadable data conforms to ARINC 615 data formatting standards by including a CONFIG.LDR header file, embedded load cyclic redundancy checks (CRCs), system address labels (SALs), and a data bus sequence, and conforms to other file structure requirements. Avionics systems currently installed in this aircraft line provide two-way communication using standard ARINC 615-3 protocol, and this protocol is used on all LRUs that require periodic software upgrades. Wiring to accommodate LRUs that use the ARINC 615-3 protocol are routed to an existing multi-deck rotary switch. In a typical Boeing 747-400, for example, up to 23 LRUs utilize this upload function. A human operator uses the rotary switch to provide connectivity between avionics units to an airborne data loader or to a connector of a portable data loader. The wiring to the switch passes from an electronics equipment (EE) bay to a centralized flight deck location.

Because of the need for manual intervention to operate switches to provide connectivity between avionics units, providing automatic uploads of avionics data from aircraft to ground stations via wireless communication links would require extensive rewiring of existing aircraft. Remotely-initiated download of data from ground stations to aircraft would also require extensive rewiring.

SUMMARY OF THE INVENTION

An exemplary implementation of the present invention provides a method for wirelessly communicating data between a plurality of avionics units on an aircraft and a data communication apparatus. The method generally includes wirelessly communicating download data for an avionics unit from the data communication apparatus to an aircraft data services link in the aircraft; automatically switching a communication path from the aircraft data services link to the avionics unit responsive to the download data; and electronically communicating the download data from the data communication apparatus to the avionics unit via the automatically switched communication path.

In another implementation, the present invention provides a method for wirelessly communicating data between a plurality of avionics units on an aircraft and a data communication apparatus. The method generally includes automatically switching a communication path from an avionics unit to an aircraft data services link in the aircraft; electronically communicating data from the avionics unit to the aircraft data services link via the automatically switched communication path; and wirelessly communicating the data from the aircraft data services link to the data communication apparatus.

Another implementation of the present invention provides an apparatus for wirelessly communicating data between a plurality of avionics units on an aircraft and a data communication apparatus external to the aircraft. The apparatus generally includes, onboard an aircraft: an aircraft data services link having a processor, means for wirelessly transmitting and receiving data to and from a data communication apparatus external to the aircraft, and a remotely controllable electronic switch; and a plurality of avionics units coupled to the remotely controllable electronic switch. The processor is responsive to data received from the data communication apparatus via the means for wireless transmitting and receiving to identify an intended destination from said avionics units from information contained in a standard format of downloaded ARINC 615 or 615A compliant data, and to automatically control the remotely controllable electronic switch to selectively couple the intended destination avionics unit to the aircraft data services link to provide data communication between the intended destination avionics unit and the data communication apparatus via the aircraft data services link.

In yet another implementation, the present invention provides an apparatus for wirelessly communicating data between a plurality of avionics units on an aircraft and a data communication apparatus external to the aircraft. The apparatus generally includes, onboard an aircraft: an aircraft data services link having a processor and means for wirelessly transmitting and receiving data to and from a data communication apparatus external to the aircraft; and a plurality of avionics units coupled to a remotely controllable electronic switch. The processor is responsive to data received from the data communication apparatus via the means for wireless transmitting and receiving to identify an intended destination from said avionics units from information contained in a standard format of downloaded ARINC 615 or 615A compliant data, and to automatically control the remotely controllable electronic switch to selectively couple the intended destination avionics unit to the aircraft data services link to provide data communication between the intended destination avionics unit and the data communication apparatus via the aircraft data services link.

Various implementations and configurations of the present invention provide automatic uploading and/or downloading of data from and/or to ground stations using a wireless communication link, without requiring extensive rewiring or redesign of existing aircraft.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
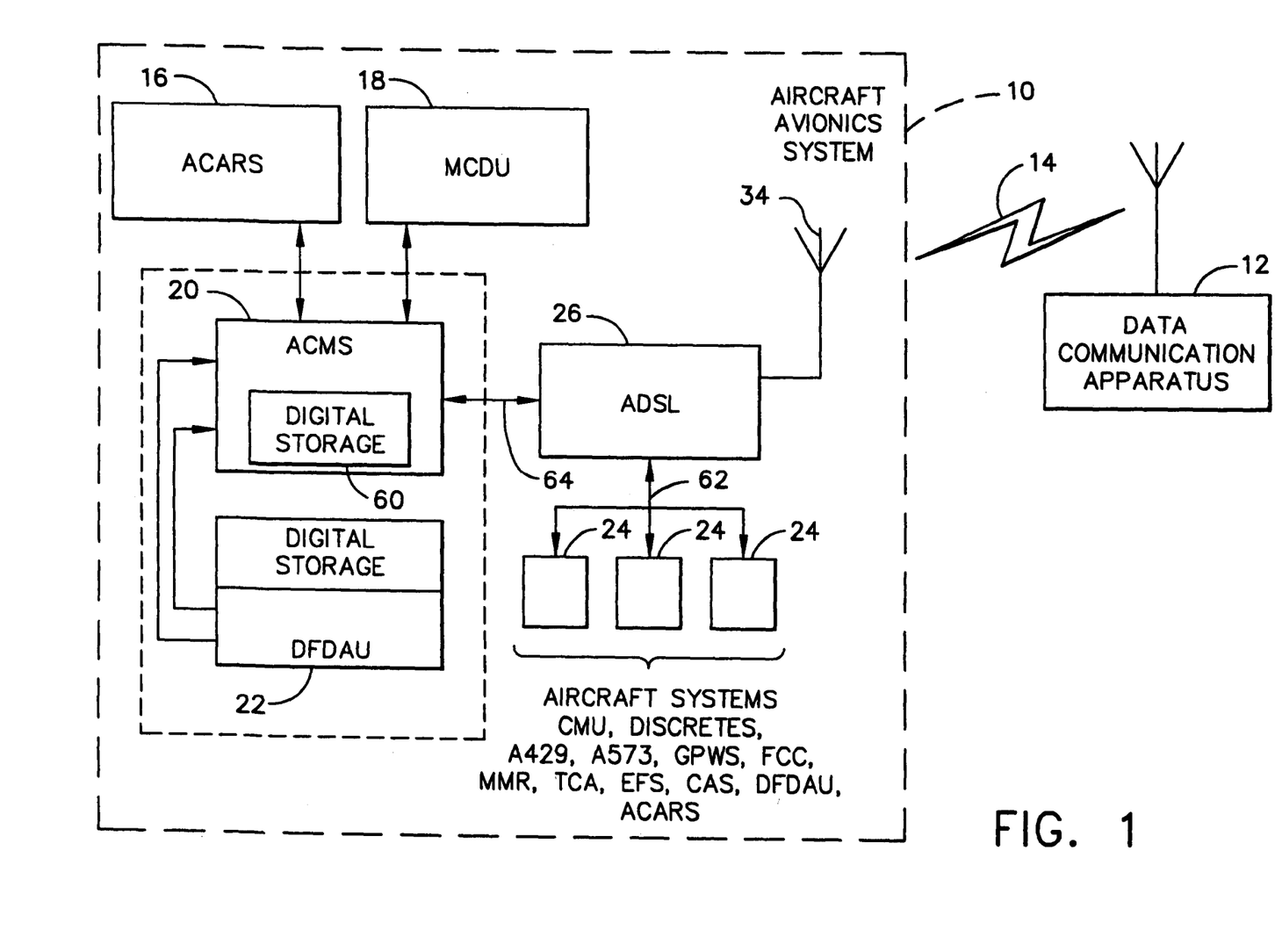
FIG. 1 is a block diagram of an exemplary configuration of an aircraft avionics system of the present invention.

In one configuration of the present invention and referring to FIG. 1, an aircraft avionics system 10 on an aircraft supports communications between the aircraft and a data communication apparatus 12. This communication is provided via a wireless data link 14. A non-exhaustive list of suitable wireless data links include VHF radio links, HF radio links, satellite communication links (SATCOM), and wireless spread spectrum links such as IEEE 802.11. Suitable devices for data communication apparatus 12 include, but are not limited to, airport ground service terminals, wireless hand-held devices such as intranet-enabled cell-phones, pilot access terminals, electronic flight bags (EFBs), and so forth. Depending upon the range of wireless data link 14, data communication apparatus 12 can be external to and a significant distance from the aircraft on which avionics system 10 is installed. In at least one embodiment of the present invention, avionics system 10 is configured to communicate with more than one data communication apparatus 12, although not necessarily with more than one such apparatus 12 at one time. For example, communication with airport ground service terminals can be provided as well as communication with hand-held devices for maintenance.

Aircraft avionics system 10 further comprises a plurality of avionics units. In one configuration, these avionics units include an aircraft communication and reporting system (ACARS) 16, a multifunction control display unit (MCDU) 18, an aircraft condition monitoring system (ACMS) 20, and a digital flight data acquisition unit (DFDAU) 22. In one configuration, ACMS 20 and DFDAU 22 comprise a single unit that provides both ACMS and DFDAU functions. In addition, a plurality of additional avionics LRUs (hereinafter avionics units) 24 are provided. These units 24 are collectively represented in FIG. 1 as aircraft systems, communications management units (CMUs), discretes, ARINC 429 systems, and ARINC 573/717 systems. Routing of data to and from a ground-based data communication apparatus 12 to and from avionics units such as 16, 18, 20, 22, and 24 is provided by an aircraft data services link (ADSL) 26 in the aircraft. For example, data transferred by ADSL 26 to and/or from data communication apparatus 12 includes, in one embodiment, software uploads and downloads, flight performance data, and applications for use by flight crew, cabin crew, maintenance crew, airport ground services and airline operations.

Figure 2:
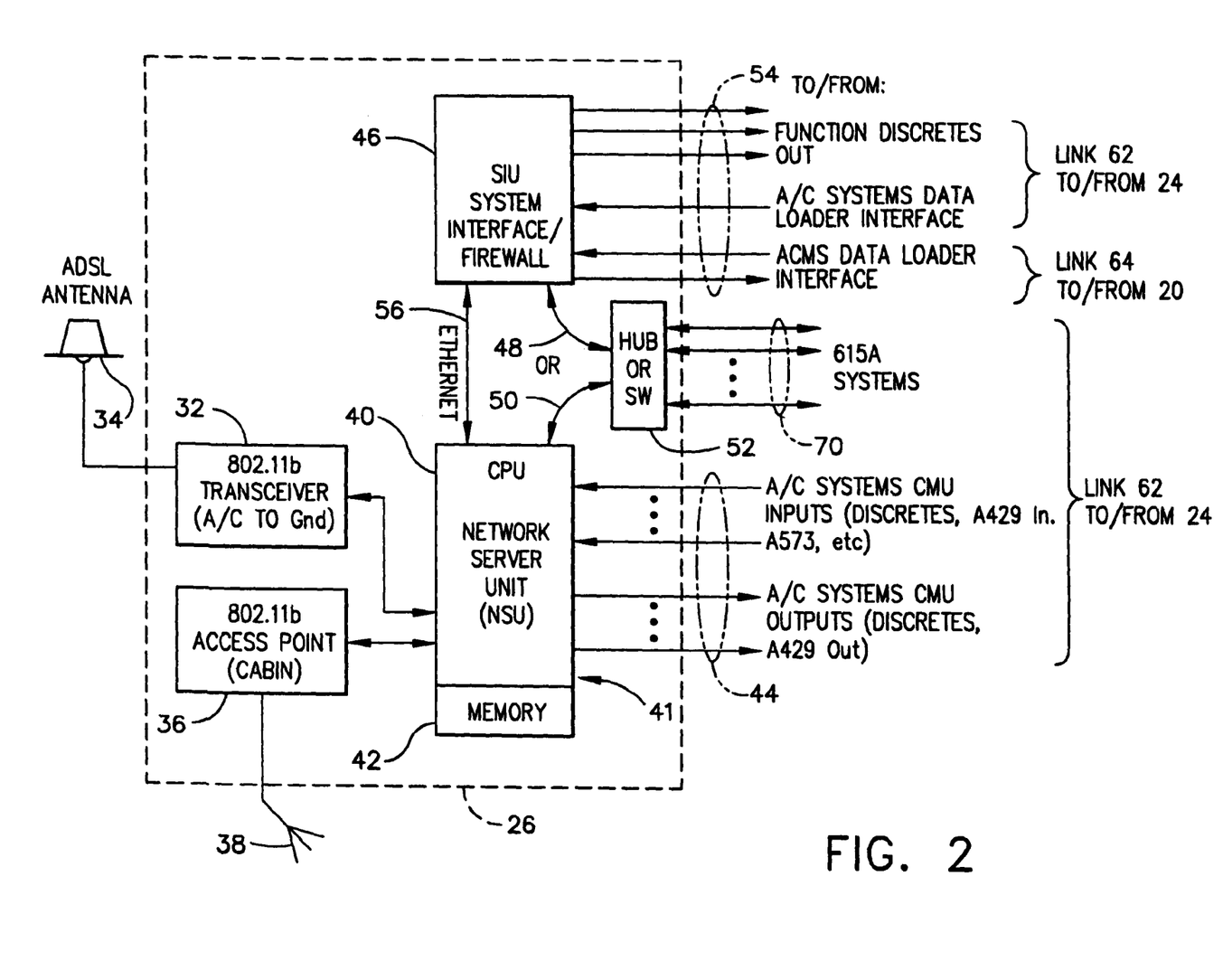
FIG. 2 is block diagram of an exemplary configuration of the aircraft data services link (ADSL) shown FIG. 1.

In one configuration and referring to FIG. 2, ADSL 26 comprises one or more means 32, 36 for wirelessly transmitting and receiving data to and from one or more data communication apparatus 12 (not shown in FIG. 2). For example, an IEEE 802.11 transceiver 32 is coupled to an antenna 34 on the outside of the aircraft to provide communication between the aircraft and a data communication apparatus 12 on the ground. An additional IEEE 802.11 transceiver 36 is provided in one configuration with an antenna 38 inside the aircraft to provide access for portable data communication apparatus onboard the aircraft, such as those used by maintenance personnel. In one configuration not shown in FIG. 2, the spread spectrum transmitter and receiver are separate components. In another configuration, transceiver 32 is any variety of IEEE 802.11 transceiver or separate transmitter and receiver, such as a separate IEEE 802.11a transmitter and receiver. In yet another configuration, transmitting and receiving means 32 is an amplitude modulation receiver and transmitter, or an amplitude modulation transceiver. (As used herein, IEEE 802.11 includes variations thereof, such as IEEE 802.11b).

Wireless transmitting and receiving means 32 is communicatively coupled to a network server unit (NSU) 41 that comprises at least one CPU or processor 40 and a memory 42. Additional wireless transmitting and receiving means 36, if present, are also coupled to NSU 41. In one configuration, memory 42 includes instructions to operate CPU 40. Included in these instructions in one configuration are instructions to maintain a database containing version identifiers of software stored in software-loadable avionics units (not shown in FIG. 2). In one configuration, the operative coupling of NSU 41 to avionics units comprises "direct coupling" to one or more externally accessible busses 44, or indirect coupling 54 via a system interface unit/firewall (hereinafter, SIU) 46. SIU 46 sends and receives data to and from NSU 41 in one configuration via an Ethernet connection 56. It will be understood that the "direct coupling" to busses 44 may include timing and level interface circuitry, as required. This circuitry is not shown in FIG. 2. However, the design of such circuitry is considered to be within the capability of one of ordinary skill in the art.

ADSL 26 further comprises a remotely controllable switch 52, sometimes also referred to as a "hub." Switch 52 sends and receives data to and from NSU 41 either directly 50, or in another configuration, via a bus or other data connection 48 to SIU 46. Switch 52 is coupled to a plurality of avionics units, represented collectively in FIG. 1 as 24. For example, switch 52 is coupled to a plurality of software-loadable ARINC 615 or 615A units. Such units have, in the past, been loaded utilizing a manually-switched connector in an avionics bay of an aircraft, because the ARINC 429 (or A429) standard does not allow more than one such unit to share a single bus. The use of a remotely controllable switch 52 permits communication between a data communication apparatus 12 and a selectively coupled avionics unit out of a plurality of such units using A429 busses (via antenna 34 or 38, and NSU 41) without shorting of A429 busses from different avionics units.

In one configuration, switch 52 is remotely controlled by NSU 41 either directly 50 or via bus or data connection 48. When data is downloaded for a selected avionics unit from a ground-based data communication apparatus 12, NSU 41 identifies the intended destination avionics unit. For example, instructions stored in memory 42 instruct NSU 41 processor 40 to buffer downloaded ARINC 615 or 615A compliant data in memory 42 and to identify the intended destination avionics source unit from information contained in the standard format of the data. Processor 40 then electronically switches hub or switch 52 (for example, by a signal sent via data connection 48 or 50 and recognized by hub or switch 52) to provide a communication path from ADSL 26 to the proper avionics unit for downloading the buffered data via the communication path to the proper avionics unit. Thus, processor 40 is responsive to data received from data communications apparatus 12 via wireless transmitting and receiving means 32 to selectively couple avionics units to ADSL 26 to provide communication between a selectively coupled avionics unit and data communication apparatus 12 via ADSL 26.

In addition, processor 40 updates its database to reflect the updated software version in that avionics unit. In configurations in which the selected avionics unit is able to report fault information pertaining to the uploaded data, this fault data is communicated back to ADSL 26 over the electronically switched communication path and wirelessly communicated via ADSL 26 back to the data communication apparatus 12 that transmitted the update. Also in one configuration, fault information is incorporated into the database stored in memory 42.

Thus, in one configuration of the present invention, a communication path such as an ARINC 429 bus is switched to provide communication continuity between an avionics unit (such as one of the units indicated collectively at 24) and ADSL 26. Data is communicated electronically from the avionics unit to ADSL 26 via this electronically switched communication path, and then this data is wirelessly communicated 14 from ADSL 26 to data communication apparatus 12. Remotely controllable switch 52 in one configuration is coupled to at least two avionics units via ARINC 429 (A429) busses, and selects one of the avionics units at a time for coupling to processor 40.

Also in one configuration of the present invention, aircraft performance data is transmitted to a ground-based data communication apparatus 12 by aircraft avionics system 10. Referring again to FIGS. 1 and 2, aircraft performance data is gathered by ACMS 20 from avionics unit sources. In one configuration, the avionics unit sources include at least one of an ACARS 16, an MCDU 18 or an DFDAU 22, or combinations thereof. This performance data is communicated from ACMS 20 to ADSL 26 electronically via communication link 64, and wirelessly 14 from ADSL 26 to data communication apparatus 12. NSU 41 processor 40 of ADSL 26 is responsive to data transferred to it by ACMS 20 and, in one configuration, is configured to schedule wireless transmission 14 of the transferred data from ACMS 20 to data communication apparatus 12. For example, a program in memory 42 executed by NSU 41 processor 40 wirelessly transmits 14 this data at scheduled times during a flight, or upon landing.

In one configuration, data carried over wireless link 14 includes configuration updates to communication management units (CMUs) 24 downloaded from a ground station to memory 42 in ADSL 26. For example, one type of update is provided as an operational control configuration (OPC) software loadable "controlled" part. Configuration management is provided by a database in the memory of ADSL 26 and at an originating ground network node (i.e., data communications apparatus 12) and are synchronized, coordinated and tracked on both the aircraft and at the ground. Real-time NSU 41 processor 40 handles data acquisition and communication between aircraft interfaces and server/router.

Databases and datasets for ADSL 26 functionality are treated as configuration updates in similar form and part number control as CMU OPC updates. Examples of such databases and datasets include navigation databases, weather maps, synthetic vision profile maps and runway maps to assist in surface awareness and/or guidance.

Operational program software (OPS) updates by ADSL 26 are handled under strict configuration control guidelines in one configuration of the present invention. Acceptance by ADSL 26 of ground station data OPS downloads via data communication apparatus 12 and storage in NSU 41 memory 42 are conditioned upon passing a number of predetermined tests, such as compatibility checks, revision history checks, and/or synchronization with a version control system at an authenticated source on the ground. In one configuration, an aircraft configuration management application in ADSL 26 is configured to perform automatic OPS downloads when required by hardware replacement, and to flag any unresolved aircraft/software compatibility issues.

In one configuration, some types of information from the avionics units are stored and time-tagged for later retrieval and transfer to a network client such as a pilot access terminal, an electronic flight bag (EFB), or ground network system (not shown in the figures). Real-time parametric data is collected from the avionics systems, including (but not limited solely to) data collected from an ARINC 573/717 output of DFDAU 22. This data is stored in a variable recording buffer (shown as digital storage 60 in FIG. 1) to attach trigger events to the function of ACARS 16. In one configuration, the window size of buffer 60 is reprogrammable via an OPC update.

In one configuration, ADSL 26 includes an avionics data acquisition function using existing ARINC 615-3 handshaking protocols. Although these protocols are used today to upload software to LRUs, physical connections and software in avionics LRUs that support an upload of fault data already exist. ADSL 26 is also used, in one configuration, to collect avionics LRU configuration information through an avionics gateway and to identify and store in memory the current software part numbers installed on an aircraft. A predefined format is used for each LRU to transmit its software part number to the ADSL 26.

In one configuration, there are six major communication paths for transfer of data.

1. Aircraft to ADSL.

Aircraft to ADSL 26 interfaces 62, 64 communicate upload fault information and configuration information for all connected ARINC 615-3 loadable systems. In one configuration, this information is also provided from ARINC 615A (Ethernet) loadable systems. (Hereinafter, both in the description and in the claims, reference to an ARINC 615 system is intended to encompass all ARINC 615 systems, irrespective of suffix, unless otherwise noted.) Examples of such systems are MCDUs and cabin terminal interfaces. This data is provided, in one configuration, via ARINC 429. In addition, data is provided from CMU interfaces via ARINC 429, discretes, and ARINC 573/717 serial outputs.

2. ADSL to Aircraft.

Bidirectional interface 62, 64 provides a dataload interface for all ARINC 615 upload software to all connected systems via ARINC 429, including, in one configuration, ARINC 615A (Ethernet). Examples of such systems are MCDU 18 and cabin terminal interfaces. This data is provided, in one configuration, via ARINC 429. In addition, data is provided from CMU interfaces via ARINC 429, discretes.

3. ADSL to Clients.

Interface 62, 64 provides fault information and software configuration information from an ARINC 615 download application for use by client-resident applications using IEEE 802.11 protocol. Examples of such systems are enhanced MCDU 18, cabin terminal functionality, software updates to be used by clients, i.e., flight crew, cabin crew, maintenance, airport ground services and airline operations. Real time data captured by ADSL 26 and outputs of "auto-report generation" applications on ADSL 26 are available for display using client resident applications.

4. Client to ADSL.

Outputs of reports generated by resident applications on client devices, such as pilot access terminals (PATs), electronic flight bag (EFB), etc. (not shown in the figures) are communicated via IEEE 802.11. Clients can emulate MCDU 18, cabin terminal interface for communications. Outputs of applications in client devices, such as pilot access terminals (PATs), electronic flight bag (EFB), etc., via IEEE 802.11.

5. ADSL to Ground

Stored data, reports transmitted automatically to or requested from a ground station via a communication link 14 (for example, HF, VHF, SATCOM, broadband, or IEEE 802.11).

6. Ground to ADSL

This data comprises software updates for avionics, configuration management synchronization information, selective fault report and configuration data requests. (Databases and configuration updates are considered as software updates for purposes of this description.)

ADSL 26 interfaces with the aircraft via the SIU 46 and via a communications router/server 44, 54, 70. SIU 46 provides an upload path for software and updates and a download path for avionics LRU stored information. The avionics LRU stored information can include, but is not limited to, avionics LRU fault information and recorded parametric data and triggered reports.

The communications router/server provides end-to-end connection from the aircraft/ground network client to any other aircraft/ground network client in a user-defined infrastructure. For example connection is provided to the flight crew using pilot access terminals or EFBs, to the cabin crew using cabin terminals or EFBs, to the maintenance crew using EFBs, PATs or any of a variety of wireless hand-held devices such as intranet web-connected cell phones, etc., to airport ground services via ground-based terminals and wireless hand-held devices, and to airline operations via ground-based terminals. Connectivity media include ARINC 429, Ethernet, HF radio, VHF radio, SATCOM narrowband, digital broadband, and IEEE 802.11 wireless protocol, as well as combinations thereof.

SIU 46 in one configuration is coupled 48 to a remotely controllable electronic switch 50 that is controlled via an Ethernet connection 56 or ARINC 429 interface, depending upon the location of a data load application. The switch is controlled in one configuration using directed commands from an "authenticated" ground station (i.e., a trusted ground-based data communication apparatus 12) or another valid network client via a terminal area wireless local area network (LAN) operating according to a compatible standard. In one configuration, IEEE 802.11 is utilized for the compatible standard. In another configuration in which an Ethernet link is used, a protocol is used between SIU 46 and NSU 41 that permits a remote station 12 of a network client to establish a direct connection to an avionics LRU such as one of avionics units 24 for uploading or downloading an ARINC 615 data. The request for this upload may be initiated using a data communication apparatus 12 such as a pilot access terminal (PAT), electronic flight bag (EFB), or a ground network client. Safety checks, such as those used for data loading by traditional 2-way ARINC communication, are used by avionics LRUs 24. These checks include embedded (or load) cyclic redundancy checks (CRCs) that are independently recalculated by a target avionics LRU 24 upon receipt, use of ARINC assigned system address labels (SAL), hardware/software compatibility checks in the LRUs, and other checks.

Figure 3:
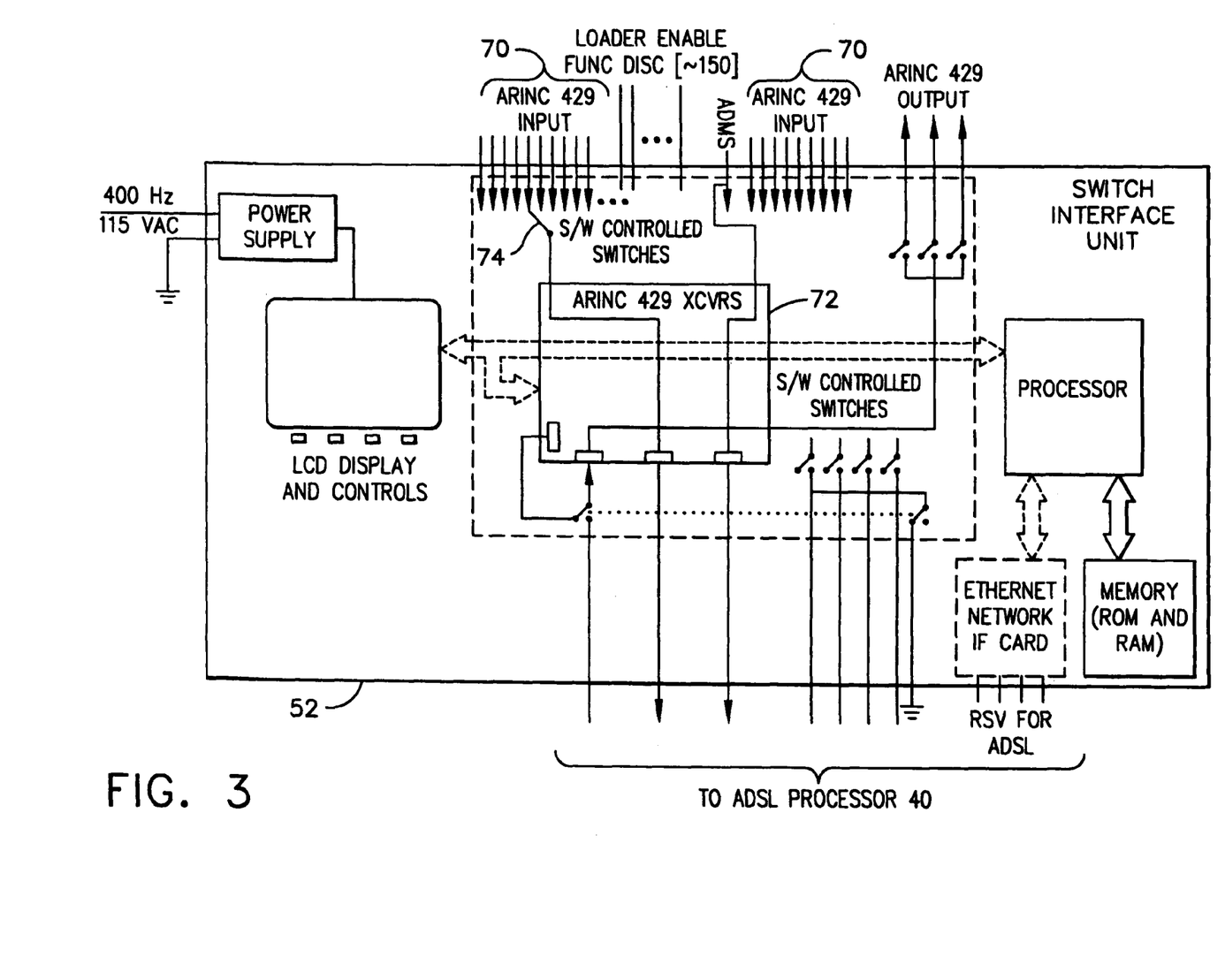
FIG. 3 is a block diagram of an exemplary configuration of a hub or switch suitable for use in the aircraft data services link (ADSL) shown in FIG. 2.

Some existing aircraft, such as the Boeing 747-400, have a permanently installed airborne data loader that is always powered up. In existing aircraft, relays and switches have been installed to isolate multiple transmitters to avoid connecting two transmitters to a single receiver at the same time. Therefore, in one configuration, a switch such as that described in U.S. Provisional Application No. 60/268,085, filed Feb. 13, 2001 (which is hereby incorporated by reference in its entirety) is used as switch 52. Referring to FIGS. 2 and 3, two or more ARINC 429 inputs 70 are directly connected to a single receiver or transceiver 72 at one time by implementing a software-controlled switch 74 at remotely controlled hub or switch 52. This implementation eliminates the need for external relays, procedural workarounds and major aircraft production revisions. ARINC 429 transceiver 72 in the embodiment of switch 52 represented in FIG. 3 actually includes two receivers as well as a transmitter, with one of the two receivers hard-wired to a single, unswitched ARINC 429 input.

In one configuration of the present invention, aircraft data services link (ADSL) 26 performs a remotely controllable data download function utilizing the data loading capabilities of existing aircraft avionics LRUs 24 including on-board servers. The download of data conforming to the ARINC 615 standard is remotely and/or automatically initiated. The transfer of download data from a network operations center (NOC) via a data communications apparatus 12 or aircraft server to an aircraft avionics unit 24 is similar to downloading of operational software using an ARINC 615 data loader, except that, rather than originating at an ARINC 615 data loader connected by cables to the aircraft, data is downloaded from an on-board server, from one or more network operations centers (NOCs) via a data communications apparatus 12 and/or from a data content service provider. Several different methods are provided in one configuration to initiate uploads. These methods include:

(1) Automatic synchronization downloading and associated auto-delete task for aircraft network clients, such as wireless handheld devices, fixed or quick disconnect flight deck mounted displays, WAP or PDA devices on a flightline, the on-board server, and avionics LRUs. When initiated by a NOC, the onboard server synchronizes with the NOC. Aircraft network clients synchronize with the on-board server.

(2) Automatic configuration management uploads, i.e., aircraft version change management, for loadable entities on the aircraft that are connected to the aircraft network. When software updates are complete, the revised software configuration information is transmitted back automatically to the enabling NOC to alert a quality assurance representative that the download has successfully completed.

(3) Responses to operator-initiated requests from authenticated clients via any of the communication paths connected to ADSL 26. Examples of such requests include access to the data from avionics LRUs without manual operator intervention on the aircraft, synchronization tasks with associated ground network systems, backup and recovery initiation, and other network requests. Network clients include, for example, one or more authorized users communicating using any of ADSL 26 communication links, cabin or flight deck mounted terminals, portable digital assistants (PDAs), wireless electronic flight bags (EFB), or one or more ground terminals.

A spread spectrum link 14 is used in one configuration of the present invention to manually initiate an ARINC 615 download. An ARINC 615 CONFIG.LDR file intended for a target LRU is configured for a download. This header file includes an appropriate system address label (SAL) for the target LRU, in addition to load CRCs, etc. A connection to a specific computer occurs prior to activating a data download when multiple computers having the same SAL are installed. A download task/configuration manager informs the operator that a connection to the target LRU has been established. In one configuration, this notification is performed in conjunction with a data loader application resident on a ground-based system, an authorized network client, or the avionics gateway. A communications protocol is utilized between the avionics gateway and an on-board server to tag the most recent configuration changes for transmission back to the NOC.

ARINC 615-3 and ARINC 615A data loader data for software, configuration, or database updates are transferred, in one configuration of the present invention, by initiating software downloads from the ground to any software loadable aircraft avionics unit (i.e., LRU) 24, for example, operational program software (OPS), operational program configuration (OPC), and databases for ARINC 615 LRUs. Systems such as flight management computers (FMCs), flight control computers (FCCs), digital flight data acquisition units (DFDAUs) 22, aircraft conditioning monitor systems (ACMSs) 22, SATCOMs, onboard servers and all other ARINC 615-3 or ARINC 615A Ethernet loadable systems can be loaded from the ground using appropriate ARINC 615-3 or ARINC 615A download commands. An aircraft data services link ADSL 26 system is resident on the aircraft to direct software download requests to any loadable system and to transmit data via existing ARINC 429 and Ethernet interfaces to software loadable systems. The ADSL includes one or more processors 40, a memory 42, a remotely controllable SIU 46, and a hub or switch 52 coupled to a transceiver 32 (such as an IEEE 802.11 transceiver) for transmission of data to an aircraft. An existing ARINC 429 data loader interface, centralized and accessible in the aircraft's flight deck compartment, in conjunction with the ADSL 26, allows direct control and transfer of software updates to aircraft subsystems within range of a ground station access point having a wireless data communication apparatus 12.

Configurations of the present invention are thus capable of providing routing and configuration management for each loadable system and terminal device connected to an aircraft local area network (LAN), both on and off an aircraft.

One suitable SIU 46 and switch 52, in one configuration, provides automated electronic switching and control for data downloading of software in the form of operational programs, operational configuration of databases, collection of software configuration information from systems such as avionics subsystems and uploading data between those subsystems and ARINC 615-3 or 615A data load applications. The data load applications may be resident in existing ARINC 615 airborne, portable, or PC-based data loaders or an optional ARINC 763 type on-aircraft network server system. In one configuration, SIU 46 and switch 52 use a real-time LINUX® based platform that is also capable of hosting any data load application. The switch interface unit can be manually controlled and used as a stand-alone replacement for existing rotary switches, or remotely controlled and integrated into an ARINC 763 type network server system.

In one configuration, SIU 46 and switch 52 are configured as a single physical unit as a stand alone, data loader rotary switch replacement. Combination SIU 46 and switch 52 in this configuration comprise a programmable electronic switch that displays and allows selection of loadable systems on an aircraft for the purpose of initiating a software data load. The input and output of the combination unit is programmable, primarily to activate interfaces with loadable LRUs connected to the combination unit, which may vary between different airplane models and airlines. In addition, in one configuration, the combination unit provides the functions of a configuration data tool and repository, by containing a collection of loadable LRUs software part numbers and by providing a data display device. The combination unit also functions as a monitor of incoming and outgoing ARINC 429 traffic, with appropriate connections initiated between communicating end-user systems and a data loader application. The data loader application may, for example, be resident in an existing ARINC 615-3 airborne loader, an ARINC 615A Ethernet loader, a portable data loader (when such is connected to a flight deck connector) or the switch interface unit itself, which is capable of hosting the data loader application in its real-time LINUX® operating system. (LINUX is a registered trademark of Linus Torvalds.) In one configuration, ARINC 615-3 data load applications are in the combination unit, because the connection with the airborne server is Ethernet only, while current airplane communication interfaces to the invention are ARINC 429. A protocol packing and unpacking scheme is not required if ARINC 615-3 is resident in one configuration of the combination unit.

In a second configuration, the combination unit is utilized in a Network Server System (NSS) that includes an airborne server. In this configuration, the combination unit can be remotely controlled through a provisional Ethernet connection that is activated only by directed commands from the airborne server and/or by directed commands from a ground station via IEEE 802.11 spread spectrum wireless connection. The combination unit may be queried for stored LRU configuration information, for example, software (S/W) part numbers from any or all of the avionics system connected to the combination unit. The combination unit may also, automatically or on request, perform compatibility checks between expected S/W part numbers stored in a resident database or external server connected to the combination unit, and actual part numbers collected by the combination unit.

The combination unit bridges a gap between interfacing with existing avionics systems for data uploading and data acquisition without drastically modifying the manner in which airplanes are currently built. The functionality of the combination unit is easily adaptable so that it can become an integral component on future on-board network systems. Embodiments of the combination unit can be used efficiently as a directed data query and download engine to an ARINC 763-type network server system. At least one embodiment allows communication with a plurality of computers, which may include a Digital Flight Data Acquisition Unit (DFDAU) and a Flight Management Computer (FMC), without manual intervention via a selection of a rotary switch.

In one configuration of the present invention, upon touchdown of an aircraft, an active query of pre-processed Aircraft Conditioning Monitoring System (ACMS), Smart Access Recorder (SAR), Quick Access Recorder (QAR), and Data Acquisition Recorder (DAR) historical data from a concluded flight obtained from avionics units 24 can be initiated using remotely selectable ARINC 429 data loader interfaces connected to a remotely controlled switch 52. No accumulated data is lost. Active queries are prevented in this configuration due to avionics systems interlocks in the air The combination unit functions as the aircraft system selector in a data load/configuration system. The combination unit is line replaceable, and has many advantages over existing rotary switches. The design of the combination unit meets and exceeds current data load interfacing requirements for avionics equipment.

Existing functionality includes acquisition of ARINC 615 data of flight operations quality assurance (FOQA) smart access recorder (SAR), quality assurance report (QAR) data and reports for aircraft communications and reporting system (ACARS) stored in ACMS 20. Functionality added in one configuration of the present invention includes uploading of stored fault information from any aircraft LRU 24 connected to ADSL 26. Common system requirements are imposed to achieve this added functionality. For example, fault message formats are specified for data upload of all connected systems for which ARINC 615 upload capability is added or newly utilized. The additional data acquisition feature, combined with storage and transmission of ARINC 615 data and the use of minor software updates to aircraft systems, allows a complete central maintenance function on non CMC-equipped airplanes such as Boeing 737s, 757s, and 767s, without associated production wiring changes.

In one configuration, ADSL 26 retrieves a smart access recorder (SAR) data stream of up to eight channels and triggered ACMS reports in addition to a QAR data stream in ARINC 615 data format. Upload retrieval time is about 164 seconds for a 2 MB file acquired from digital flight data acquisition unit DFDAU 22 ARINC 573/717 serial bus output. A 2 MB file represents one flight's worth of flight operations quality assurance (FOQA) data, nominally defined as 2 hours for a flight. The uplink retrieval time is 164 seconds as a result of the data retrieval method used prior to 802.11b transfer. More specifically, the downlink retrieval time includes 160 seconds on ground plus 4 seconds for aircraft ground data transfer. A 40 MB file represents a transfer at the end of a day's worth of flights. The uplink retrieval time for this 40 MB file is 160 seconds, because 18 MB hes already been acquired by the server application for previous flight legs. A 200 MB file represents a transfer at the end of two weeks of flights. (200 MB represents a capacity of PCMCIA cards used for FOQA storage devices such as QARs and ACMS.) The uplink retrieval time for this 200 MB file is 400 seconds, because 198 MB is acquired by the server application for previous flight legs.

It will thus be seen that configurations of the present invention reduce or eliminate the need for manual intervention to operate switches to provide connectivity between avionics units, and thus provide the capability to automatically upload avionics data from aircraft to ground stations via wireless communication links without requiring extensive rewiring and/or redesign of existing aircraft. The capability for remotely-initiated download of data from ground stations to aircraft is also provided without extensive rewiring and/or design.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for wirelessly communicating data between a plurality of avionics units on an aircraft and a data communication apparatus, said method comprising:
   wirelessly communicating download data for a selected one of said avionics units from the data communication apparatus to an aircraft data services link in the aircraft, without adding any additional identifying information to said download data;
   using a processor in communication with the aircraft data services link to determine, from said download data, that said download data is to be received by said selected avionics unit; and
   using the processor to automatically control a switch to select one of a plurality of communication paths to different, independent avionics units, in response to said download data, that places the aircraft data services link in communication with said selected avionics unit in response to said download data; and
   electronically communicating said download data from said data communication apparatus, through said selected communication path established by said switch, to said selected avionics unit.

2. A method in accordance with claim 1, wherein said wirelessly communicating download data comprises wirelessly communicating said download data via a wireless spread spectrum link.

3. A method in accordance with claim 1, further comprising electronically communicating fault information pertaining to said download data from said selected avionics unit to said aircraft data services link via the switch and an automatically selected one of said communication paths, and wirelessly communicating said fault information from said aircraft data services link to said data communication apparatus.

4. A method in accordance with claim 1, further comprising:
   electronically communicating aircraft performance data from an aircraft condition monitoring system on said aircraft to said aircraft data services link;
   wirelessly transmitting said aircraft performance data from said aircraft data services link to said data communication apparatus; and
   said aircraft condition monitoring system obtaining said aircraft performance data via an electronic communication from at least one member of the group consisting of:
   an aircraft communication and reporting system on said aircraft,
   a maintenance control display unit on said aircraft, and
   a digital flight data acquisition unit on the aircraft.

5. A method in accordance with claim 1, wherein said communication paths comprise an aircraft industry standard bus.

6. A method in accordance with claim 1, wherein said download data comprises flight operations quality assurance data.

7. A method for wirelessly communicating data between a plurality of avionics units on an aircraft and a data communication apparatus, said method comprising:
   wirelessly communicating download data for a first selected one of said avionics units on the aircraft from the data communication apparatus to an aircraft data services link in the aircraft, without adding any additional identifying information to said download data;
   using a processor carried on the aircraft and in communication with the aircraft data services link to determine, from said download data, that said download data is to be received by said selected first one of said avionics units;
   using the processor to automatically control a switch to select a first communications path from a plurality of available communications paths to place the first selected one of said avionics units in communication with the aircraft data services link;
   transmitting said download data over the first communications path to said first one of said avionics units;
   further automatically controlling the switch to establish a second communications path from a selected second one of said avionics units to the aircraft data services link in the aircraft when an upload of data to said data communication apparatus is to be performed;
   electronically communicating said data from said selected one of said avionics units over said second communications path to said aircraft data services link; and
   wirelessly communicating said data from said aircraft data services link to said data communication apparatus.

8. A method in accordance with claim 7, wherein said first and second communications paths comprise an aircraft industry standard bus.

9. A method in accordance with claim 7, further comprising electronically communicating aircraft performance data from at least one member of a group consisting of:
   an aircraft condition monitoring system on said aircraft,
   a maintenance control display unit on said aircraft, and
   a digital flight data acquisition unit,
to said aircraft data services link, and wirelessly transmitting said aircraft performance data from said aircraft data services link to said data communication apparatus.

* * * * *

UNITED STATES PATENT AND TRADEMARK OFFICE
CERTIFICATE OF CORRECTION

PATENT NO. : 7,908,042 B2  Page 1 of 1
APPLICATION NO. : 11/187085
DATED : March 15, 2011
INVENTOR(S) : Roger R. Brinkley

It is certified that error appears in the above-identified patent and that said Letters Patent is hereby corrected as shown below:

Title Page,

Insert the following heading and information:

--(63)  Related U.S. Application Data
Continuation of U.S. Application No. 10/883,029, filed June 30, 2004, which is a Continuation of U.S. Application No. 10/075,083, filed February 12, 2002.
(60) Provisional Application Data
U.S. Provisional Application No. 60/268,085, filed February 13, 2001.--**

Signed and Sealed this
Tenth Day of July, 2012

David J. Kappos
*Director of the United States Patent and Trademark Office*